(12) United States Patent
Whitmer et al.

(10) Patent No.: US 10,860,531 B2
(45) Date of Patent: Dec. 8, 2020

(54) CREATION AND IMPLEMENTATION OF DESIGNATED TIME POINTS IN A VERSION EXPIRATION ENVIRONMENT

(71) Applicant: EMC IP Holding Company LLC, Hopkinton, MA (US)

(72) Inventors: Ray David Whitmer, Peasant Grove, UT (US); Ajit Kumar Verma, Riverton, UT (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 251 days.

(21) Appl. No.: 16/203,284

(22) Filed: Nov. 28, 2018

(65) Prior Publication Data
US 2019/0095452 A1 Mar. 28, 2019

Related U.S. Application Data

(63) Continuation of application No. 15/081,531, filed on Mar. 25, 2016, now Pat. No. 10,191,906.

(51) Int. Cl.
*G06F 16/11* (2019.01)
*G06F 11/14* (2006.01)

(52) U.S. Cl.
CPC ........ *G06F 16/125* (2019.01); *G06F 11/1458* (2013.01)

(58) Field of Classification Search
CPC .................... G06F 16/125; G06F 11/1458
See application file for complete search history.

(56) References Cited

U.S. PATENT DOCUMENTS

| 7,979,649 | B1 | 7/2011 | Thiam |
| 10,120,763 | B1 | 11/2018 | Whitmer et al. |
| 2001/0034737 | A1* | 10/2001 | Cane .................. G06F 11/1458 |
| 2007/0136381 | A1 | 6/2007 | Cannon |
| 2011/0012836 | A1 | 1/2011 | Zhang |
| 2011/0239152 | A1 | 9/2011 | Jensen |
| 2012/0215743 | A1 | 8/2012 | Triantafillos |

OTHER PUBLICATIONS

U.S. Appl. No. 15/081,470, filed Mar. 25, 2016, Whitmer et al.
U.S. Appl. No. 15/081,531, filed Mar. 25, 2016, Whitmer et al.
U.S. Appl. No. 15/081,470, Feb. 16, 2018, Office Action.
U.S. Appl. No. 15/081,531, May 25, 2018, Office Action.
U.S. Appl. No. 15/081,470, Jul. 16, 2018, Notice of Allowance.
U.S. Appl. No. 15/081,531, Oct. 29, 2018, Notice of Allowance.

* cited by examiner

*Primary Examiner* — Etienne P Leroux
(74) *Attorney, Agent, or Firm* — Workman Nydegger

(57) ABSTRACT

In one example, a method includes receiving a most recent backup version of client data, marking the most recent backup version to indicate that the most recent backup version has no expiration time, determining a currency span of an earlier backup version that is the backup version whose creation time is next most recent after a creation time of the most recent backup version, identifying all curtains in the currency span, each of the curtains being associated with a respective rule concerning a life of the earlier backup version, applying each of the rules to the earlier backup version, and whichever rule whose application results in the latest expiration time for the earlier backup version is the controlling rule, and assigning an expiration time to the earlier backup version according to the controlling rule.

20 Claims, 8 Drawing Sheets

CREATION AND IMPLEMENTATION OF DESIGNATED TIME POINTS IN A VERSION EXPIRATION ENVIRONMENT

RELATED APPLICATIONS

This application is a continuation of, and hereby claims priority to, U.S. patent application Ser. No. 15/081,531, entitled CREATION AND IMPLEMENTATION OF DESIGNATED TIME POINTS IN A VERSION EXPIRATION ENVIRONMENT, and filed Mar. 25, 2016. This application is also related to U.S. patent application, Ser. No. 16/203,348, entitled CREATION AND IMPLEMENTATION OF DESIGNATED TIME POINTS IN A VERSION EXPIRATION ENVIRONMENT, filed the same day herewith. All of the aforementioned applications are incorporated herein in their respective entireties by this reference.

FIELD OF THE INVENTION

Embodiments of the present invention generally concern management of data backups. More particularly, at least some embodiments of the invention relate to systems, hardware, computer-readable media, and methods directed to the implementation and use of policies and rules for governing the management of data backups.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was lost or compromised, and then restore that data to one or more locations, machines and/or environments.

While there is little question about the need to back up important data, the ongoing accumulation of multiple versions of one or more files or other objects can result in the storage of a vast amount of data, much of which may never even be accessed or used. This may not be a particularly significant problem, for example, at an individual file level where a user may hit 'SAVE' multiple times during the creation or editing of a document, but this ongoing accumulation of file or object versions can be a significant problem, for example, at an enterprise level.

In particular, saving specific versions of backed up files can be valuable, but preserving every possible version pushes the system towards inefficiency, chaos, and irrelevance. To illustrate, if a user has a database file that is continuously updating such that the database file gets backed up once every minute, 1440 backups will be created each day for that database file. Depending upon the retention policy, the user may keep 1440 backups per day, extending back over the entire retention period, and a totaling over half a million versions in a year.

A further complication is the way in which a particular user or customer may choose to back up their data. For example, some backups may be performed continuously. That is, the backup system backs up changes as soon as the changes are perceived by the backup system. This continuous backup approach can lead to the rapid generation of large amounts of backed up data, particularly in an enterprise context.

As another example of data storage methodologies, objects such as files may be backed up independently of each other, or may be backed up as a group as part of a container backup. The former approach can be used where there is a need to maintain independence between files. Thus, for example, different files may be stored in different respective containers and, as such, backups can be performed at a relatively high level of granularity. However, management of the respective backups of multiple independent files may be significantly more complicated than management of a single container that contains multiple files. On the other hand, management of backed up data at a container level, for example, is relatively easy to implement but reduces flexibility since the files in the container are managed as a group, rather than individually.

Moreover, some data backup customers prefer to maintain data backups that go back in time for relatively long periods, such as a year or more. However, if all of the backups are retained, and if continuous backups are performed, it is possible that millions of versions of a single file may be retained. Thus, the amount of backed up data can grow rapidly, resulting in ever-increasing storage costs for the enterprise, often with little or no return on the investment. In particular, these costs are often not well spent since the majority of versions that are backed up may never be accessed or used.

One possible approach to gain a measure of control over the amount of data that is stored might involve the use of expiration times/dates for one or more of the backups. For example, a backup can be set to expire 30 days after creation of the backup. Thus, backups would be automatically deleted on an ongoing basis, based on their expiration date.

However, one problem with setting an expiration date for an object version based on the creation date of the object version relates to the number of versions that may exist for that object. In particular, while this approach has some attractiveness due to its simplicity, it fails to take into account the number of existing versions of that object. For example, if the backup that is set to expire in 30 days is the only backup of a file and/or is the most recent backup of that file, it makes little sense to delete that backup, notwithstanding that 30 days may have passed.

As the foregoing example illustrates, a file may be deleted too early because this approach fails to account for the number of backed up versions of the file. A related problem with such an approach is that a file may be deleted too late, for example, only after multiple additional backup versions, not all of which may be needed, have been created and stored.

In view of problems such as those noted above, and/or others, it would be useful to define and implement rules and policies to determine at what point in time a particular version of an object can be deleted from storage. As well, it would be useful to be able to define rules and policies which, when implemented, can automatically reduce the number of stored versions of an object as the current version of that object ages. Finally, it would be useful to be able to determine the point in time when a particular version of an object expires and can be deleted from backup, and such a determination is based not only on the time of creation of that particular version but also the time of creation of the next successive version.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
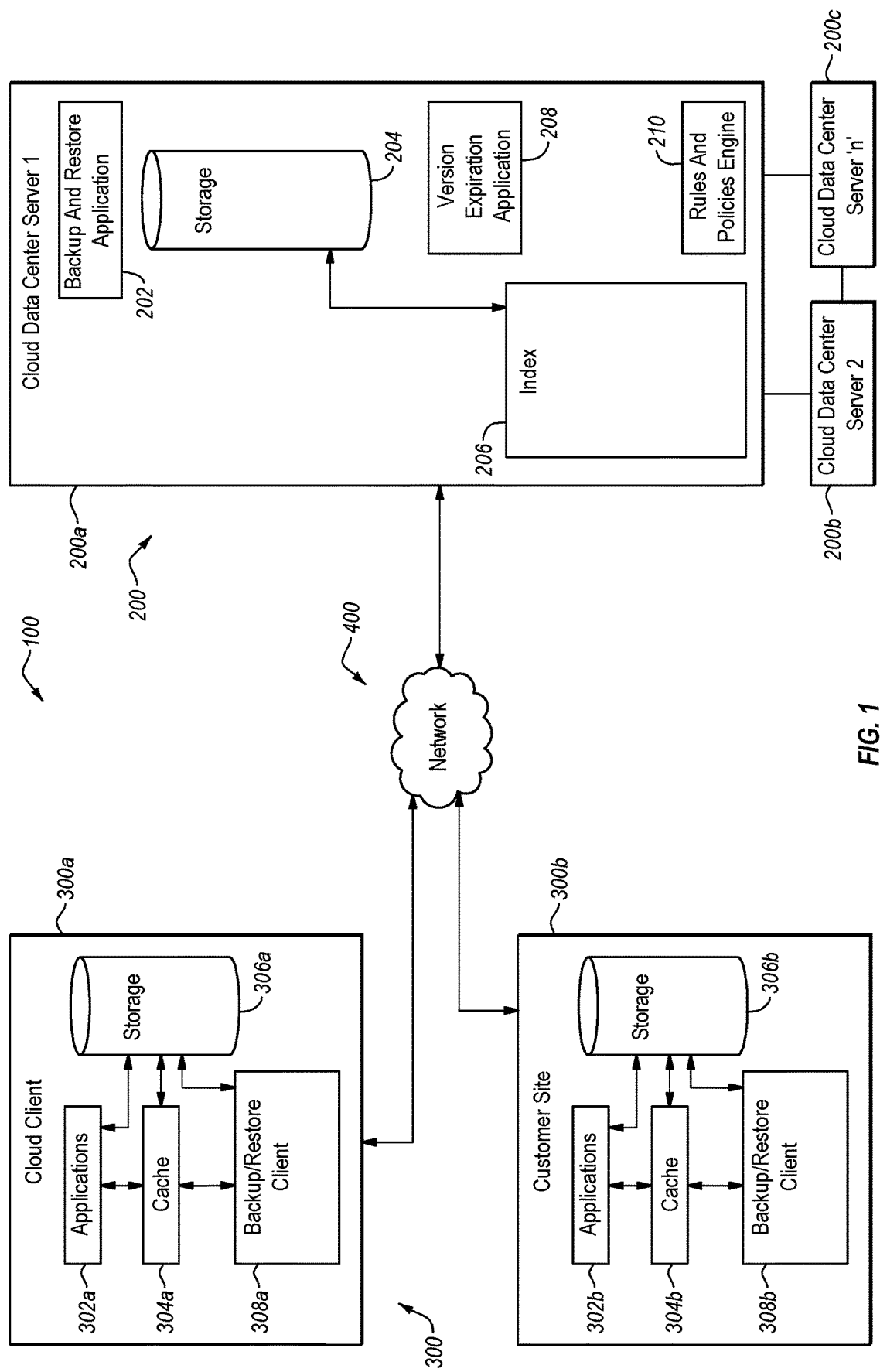
FIG. 1 is directed to aspects of an example operating environment for at least some embodiments.

Embodiments of the present invention generally concern management of data backups. More particularly, at least some embodiments of the invention relate to systems, hardware, computer-readable media, and methods directed to the implementation and use of policies and rules for governing the management of data backups. Such management of data backups may involve, among other things, the use of backup version expirations, which can be applied automatically by way of the policies and rules. Embodiments of the invention can be employed, for example, in connection with backed up data residing in a cloud storage environment, but the scope of the invention is not limited to such applications and environments.

Embodiments of the invention can be employed in connection with any type of data. As used herein, the term 'data' is intended to be construed broadly and includes, by way of example and not limitation, data blocks, atomic data, chunks, segments, emails, objects, files, blocks, file structures, directories, volumes, and any group of one or more of the foregoing. The data can be of any type, and the scope of the invention is not limited to any particular type, or types, of data. While some embodiments of version expiration disclosed herein can be applied at the object level, the scope of the invention is not limited to those example embodiments. More generally, version expiration can be applied at any level of data.

As well, it should be understood that the term 'backup,' as used herein, is intended to be broadly construed and is not limited to any particular type or form of backup. Thus, backup, as contemplated by this disclosure, embraces, but is not limited to, full backups, snapshots, incremental backups, de-duplicated backups, and any other circumstance or process where data that is desired to be protected is copied to one or more backup resources for protection and later restoration.

In connection with the examples noted immediately below, as well as the examples disclosed elsewhere herein, it should be noted that the use of the term 'file' is employed simply as a convenient way to illustrate aspects of embodiments of the invention. However, and as noted elsewhere herein, the scope of the invention is not limited to the use of files nor to any other particular form, group, set, combination or string, of data.

In general, at least some embodiments of the invention may provide for a gradual consolidation, over time, of backup versions of an object. By way of illustration, the number of retained backups for a particular user in one embodiment may be reduced to 12 backups over the past day, 7 daily backups over the last week, 5 weekly backups over the last month, 3 monthly backups, 4 quarterly backups, and 10 yearly backups, for a total of only 41 versions, with more expired versions awaiting consolidation in the dependency chain.

In at least some embodiments, rules, and policies which include one or more rules, are defined and implemented that can be used to determine at what point in time a particular backup version of an object can be deleted from storage, that is, an expiration time. This determination may be based not only on the time of creation of that particular backup version but additionally based on the time of creation of the next successive backup version. Such rules and policies can be employed, for example, to automatically reduce the number of stored backup versions of an object as the current version of that object ages. For example, the use of the polices and rules can be used to assign expiration times to one or more backup versions, such that when an expiration time arrives, the backup version, or backup versions, to which the associated rule applies, is/are automatically deleted.

In general, an expiration time for a particular backup can be determined based on a set of parameters that comprises, or consists of (i) the time that the particular backup version was created, and (ii) the time that the next successive backup version was created. More particularly, these two creation times can be used to determine what may be referred to herein as a currency span, that is, the time span over which the particular backup version was the current version. Put another way, the length of the currency span is the amount of time that has elapsed between the creation time of that particular object version and the creation time of the next newer version of the same object stored in the same media location. A currency span can extend over any length of time. Thus, a currency span can be short, one minute for example, or long, one year for example, or can be any other length.

As well, a variety of rules, any one or more of which may or may not be default rules, can be defined and implemented in connection with various embodiments of the invention. Some rules may be generally applicable, while other rules may be specific to one or more designated points in time that fall within a currency span of a backup version.

In general, a rule defines when a backup version will expire by causing the addition of a particular amount of time to the life of that backup version, at the end of which, that backup version expires. In this way, application of the rule determines the expiration time of the backup version. More specifically, at least some rules take effect at one or more designated time points within the time interval defined by the currency span. Each of these designated time points may be referred to herein as a 'curtain,' and a given currency span may be crossed by as few as no curtains, or may be crossed by multiple curtains. The addition of time to the lifespan of a backup version, as dictated by a rule, occurs as a result of that backup version having crossed one or more curtains during its currency span. Some example rules are discussed below.

In some embodiments, a first rule, which can be a default rule, is defined which specifies that the current backup version, regardless of its age, is never deleted so long as it remains the current backup version. Thus, this first rule does not necessarily apply at any particular curtain, but instead is generally applicable, and at all times. In these and/or other embodiments, a second rule, which may also be a default rule, can additionally be defined which specifies that any backup version that is created will live a specified minimum amount of time, such as at least one day, after its creation. This second rule does not necessarily apply only at a particular curtain, or curtains, nor to a particular backup version but, instead, is generally applicable to all backup versions, and at all times.

As noted above, the current backup version remains alive and unexpired until such time as a new backup version is created. Once the new backup version has been created, the currency span can then be determined, since the creation date of the previously current backup version, and the creation date of the new backup version, are both known. When the bounds of the currency span have been determined, each of the designated time points, or curtains, a determination is made as to which rule(s) apply to the time frame defined by the currency span. Since each curtain is associated with a rule, this determination can be made by examining the curtain(s) to determine which rule(s) apply at each curtain.

Once the applicable rules have been identified, each of those rules can be used to calculate a respective expiration time for the formerly current backup version. In some embodiments at least, whichever rule results in the longest life, that is, the latest expiration, for that backup version is then applied to that backup version.

Thus, each time a new backup version is created, an expiration time is assigned to the immediately preceding backup version, with the result that there is only ever one backup version that has no expiration time assigned, namely, the current backup version. Every other backup version has an expiration time and will expire, and be deleted from storage, upon the arrival of that time.

It should be noted here that the term immediately preceding backup version refers to the backup version relative to which the current backup version is the next successive backup version in time, and the time gap between the immediately preceding backup version and the current backup version need not have any particular length. Although not normally the case, it is possible that backup versions can be created in the time gap between the immediately preceding backup version and the current backup version. As noted elsewhere herein, such backup versions may have an 'invalid' bit set so that they are not considered in computing expiration times.

In some embodiments, an expiration date of a backup version can be recalculated in certain circumstances, notwithstanding that the backup version had already been slated for expiration and deletion. For example, if a backup version should be deleted, whether automatically or manually, the currency span of the immediately preceding version may be recomputed since the currency span of that immediately preceding version has now been lengthened to cross the curtain(s) that had previously fallen within the currency span of the now-deleted immediately following version. Correspondingly, the immediately preceding version may, once again, become the current version as a result of the deletion of the immediately following version.

It should be noted that the aforementioned concepts can apply both to the current version of a backup, and to backup versions whose expiration date has been set. For example, if the current version is deleted, the immediately preceding version becomes the current version and its currency span will be extended to cover any curtains crossed by the previously current version. The same general approach can be taken if the deleted version is other than the current version.

As well, because each curtain may have one or more rules associated with it, a change to the length of the currency span may result in a corresponding change to the expiration of the back version whose currency span changed. In particular, since the currency span now embraces curtains that it formerly did not, those curtains implicate still other rules that can affect the expiration date of that backup version.

Finally, a sequence definition can be created that, when run, will generate a sequence of designated points in time, or curtains, that can be used as disclosed herein. In at least some embodiments, the sequence definition includes multiple numeric fields, any one or more of which can be parameterized to define the boundaries of a set of values embraced by the sequence definition.

Advantageously then, at least some embodiments of the invention provide for de-cluttering backed-up versions, so as to optimize the size, speed, and relevance of listings and repositories, while also promoting durability as an important purpose of backup. The ability to consolidate backup versions on a variable scale may enable limitation of risk-accumulating dependency chains of incremental backups, where each backup in the chain contributes its own risk of loss to the risk of loss of the entire chain. As older versions are thinned out, risk decreases and durability increases. Approaches such as this may, among other things, restore significant durability for active files over the existing system where risk-contributing dependency chains are much longer.

A. Example Operating Environments

In general, embodiments of the invention may include and/or be implemented in an operating environment that includes various clients and/or other devices that generate and/or cause the generation of data that is backed up at a cloud storage site and/or other site. In at least some embodiments of the invention, any of the methods disclosed herein can be performed in whole or in part at a cloud storage site, although that is not necessarily required.

As used herein, the term client is intended to have broad scope and embraces, among other things, any system, device, or combination of those, by way of which direct access to cloud based storage can be achieved. As such, one or more clients may be in a cloud system, and/or one or more clients may be located at a customer site. Similarly, the term backup server is intended to have broad scope, and embraces, among other things, any backup server and associated storage device or system that are located remotely relative to a client. As such, one or more backup servers may be part of a cloud based storage system, such as a cloud datacenter, for example.

With attention now to FIG. 1, details are provided concerning some operating environments, one example of which is denoted at 100, in connection with which various embodiments of the invention may be employed. In FIG. 1, the example operating environment 100 may be a network such as a local area network, a wide area network, the internet, or any other networked configuration. Moreover, the operating environment 100, or any group of one or more of its elements, may comprise, form an element of, or constitute, a cloud computing environment. The operating environment 100 may include various devices including servers and other computers that are interconnected. The operating environment 100 may employ a variety of communication media, such as hardwire, wireless, or some combination thereof. In some instances, some or all of the operating environment 100 may comprise an optical communication network.

As indicated in FIG. 1, the example operating environment 100 includes a cloud datacenter 200 that may include one or more cloud datacenter servers, such as datacenter servers 200a, 200b and 200c. For the purposes of the discussion, only datacenter server 200a will be discussed but it should be understood that datacenter servers 200b and 200c may be similar, or identical, to datacenter server 200a in terms of operation and/or configuration. In at least some embodiments, two or more of the datacenter servers 200a-200c can communicate with each other, although that is not required. In general, the datacenter server 200a is implemented as a backup server that is able to communicate with one or more clients 300a and 300b, either directly or by way of an a communications network 400, to transmit data to, and receive data from, the clients 300a and 300b. Examples of backup servers include, but are not limited to, the EMC Avamar server, and the EMC NetWorker server.

With continued reference to FIG. 1, further details are provided concerning the example datacenter server 200a. As indicated, the datacenter server 200a may include a backup and restore application 202 that cooperates with a backup client, discussed below, residing on one or more clients 300 such as a cloud client 300a and customer site 300b, to backup data generated by and/or at the direction of applications residing at, or accessible by, the clients 300. The datacenter server 200a also includes, or has access to, storage 204 that stores backup data for one or more clients. The data stored for each client can include one or more backups of that client, or a portion of that client. To facilitate management of backup and restore processes, the datacenter server 200a may also include one or more backup indexes 206 that includes information, such as an expiration time for example, concerning each backup version stored at the datacenter server 200a. As well, the datacenter server 200a includes a version expiration (VE) application 208 which may perform any of the disclosed methods, in any combination. The version expiration application 208 can be separate from, or integrated with, the backup and restore application 202. Finally, the datacenter server 200a may include a rules and policies engine 210 which may generate rules and policies for determining expiration times for one or more backup versions stored at, and/or accessible by, the datacenter server 200a.

With continued reference to FIG. 1, and as noted earlier, a cloud datacenter including one or more datacenter servers may communicate with one or more clients, two examples of which are denoted at 300a and 300b, respectively. As the clients 300a and 300b may share a number of similarities, only client 300a is addressed in the following discussion.

Among other things, the client 300a may include one or more applications 302a, a local cache 304a, local storage 306a, and a backup/restore client 308a. With reference to the applications 302a, example applications include, but are not limited to, word processing, email, database management, and any other application(s) capable of generating, and/or causing the generation of, data that can be backed up at the cloud datacenter 200.

B. Example Host Configuration

Figure 2:
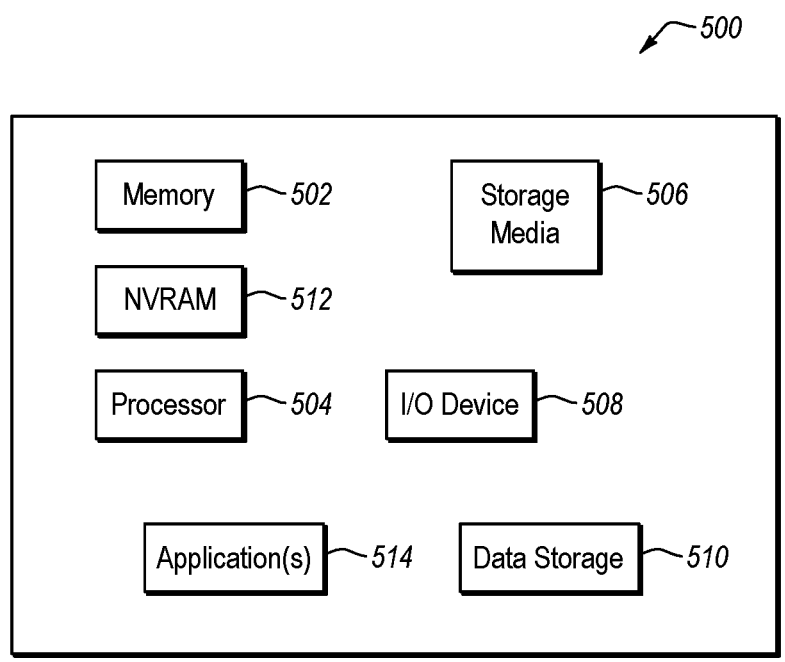
FIG. 2 is directed to an example computing device that may be employed in connection with some embodiments of the invention.

With reference briefly to FIG. 2, one or more of the cloud datacenter 200, cloud datacenter servers 200b-200c, and client 300 can consist of, comprise, or take the form of, one or more physical computing devices, one example of which is denoted at 500 in FIG. 2. In the example of FIG. 2, the computing device 500 includes a memory 502, one or more hardware processors 504, non-transitory storage media 506, I/O device 508, data storage 510, and NVRAM 512. As well, one or more applications 514 are provided that comprise executable instructions. Such executable instructions can take the form, for example, of any one or more of a backup/restore application, a backup/restore client, a version expiration application, and a rules and policies engine. Additional, or alternative, applications can likewise be included in the applications 514.

C. Aspects of Backup Version Expiration

It should be understood that the disclosure of the Figures of the present disclosure is presented only by way of example, and variations and modifications of those examples will be apparent to a person of ordinary skill in the art having the benefit of the present disclosure and, as such, those variations and modifications are considered to be within the scope of this disclosure.

Figure 3:
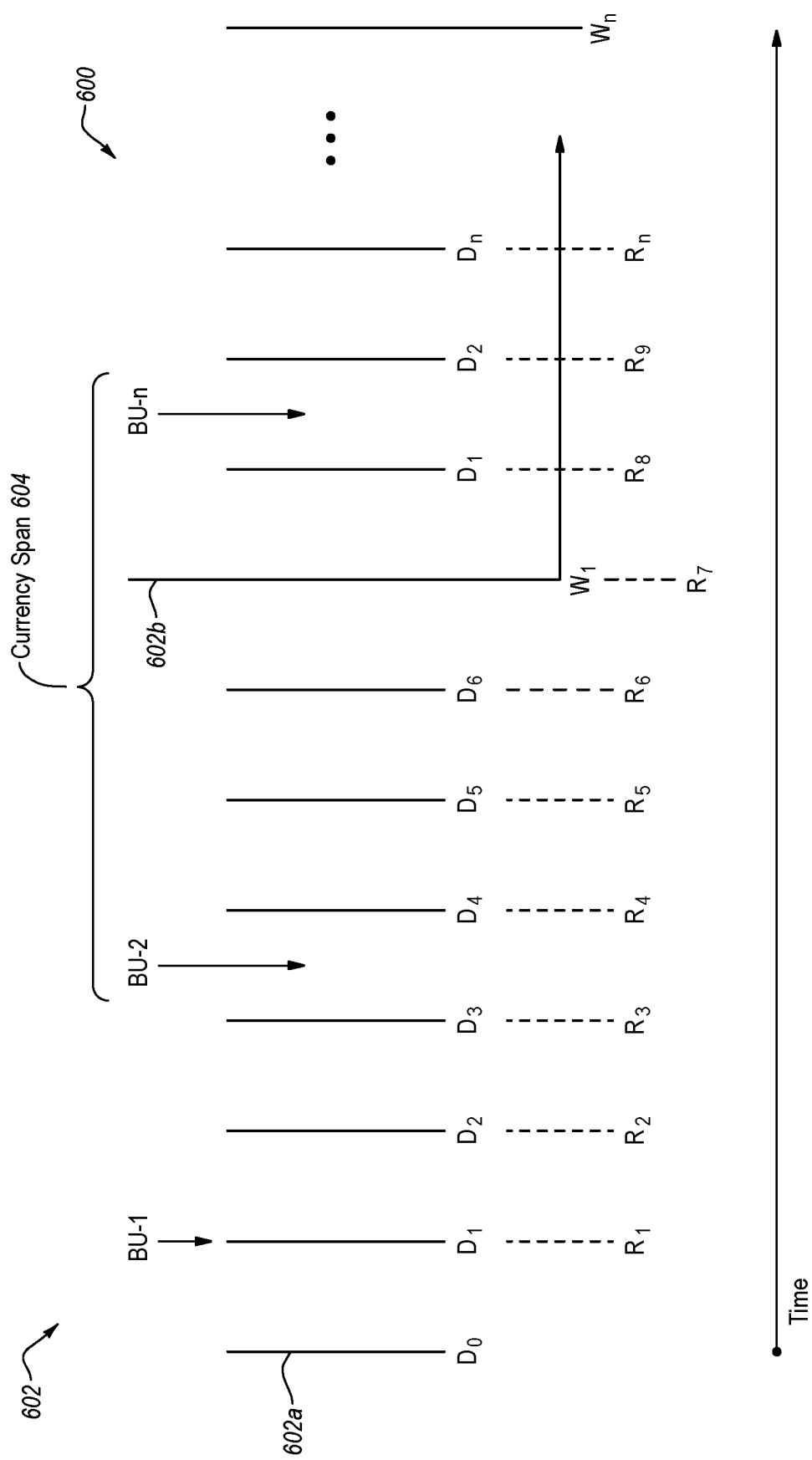
FIG. 3 discloses aspects of an example currency span of a backup version.
Figure 4:
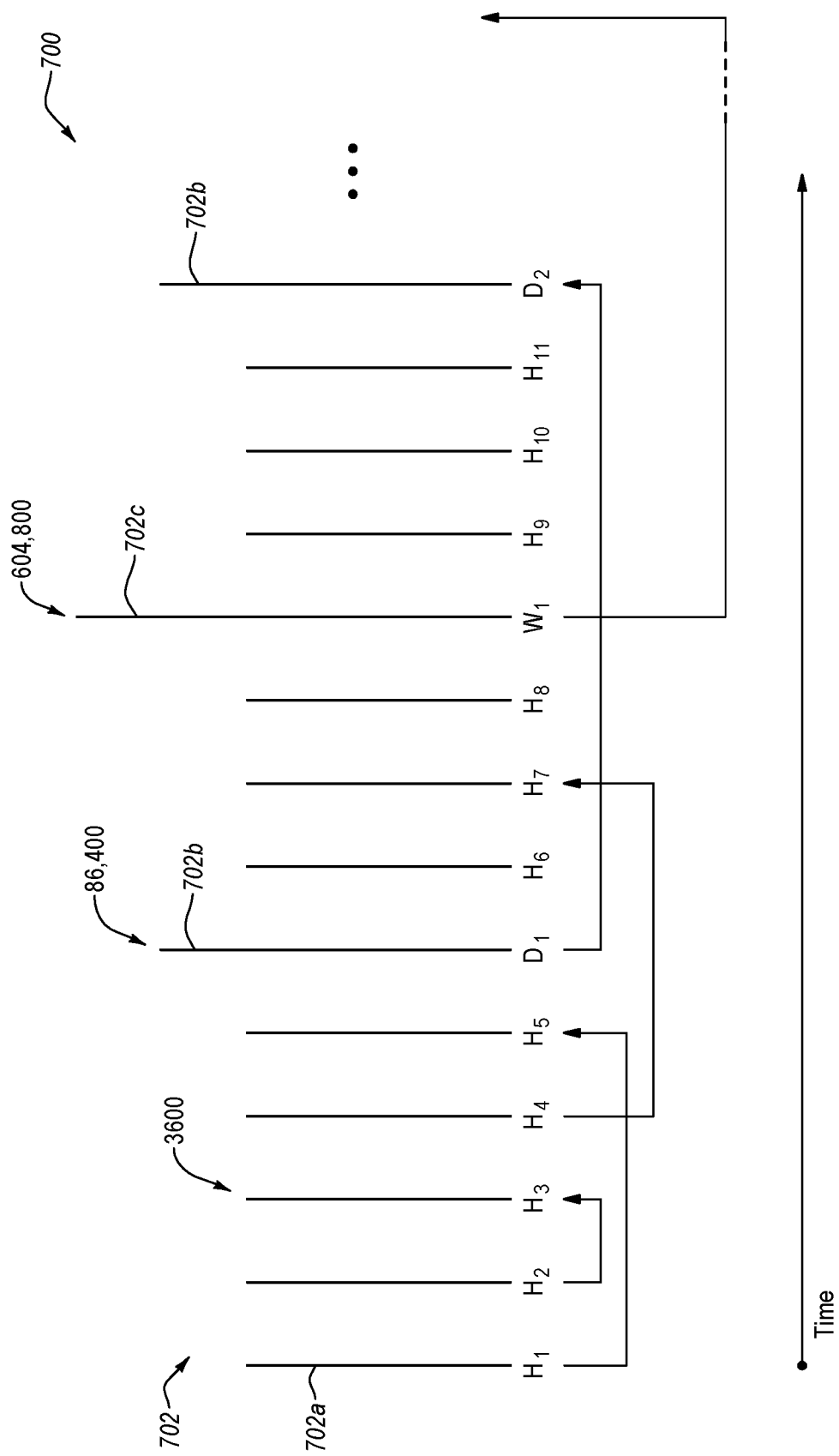
FIG. 4 discloses aspects of an example arrangement of curtains in a version expiration configuration.
Figure 5:
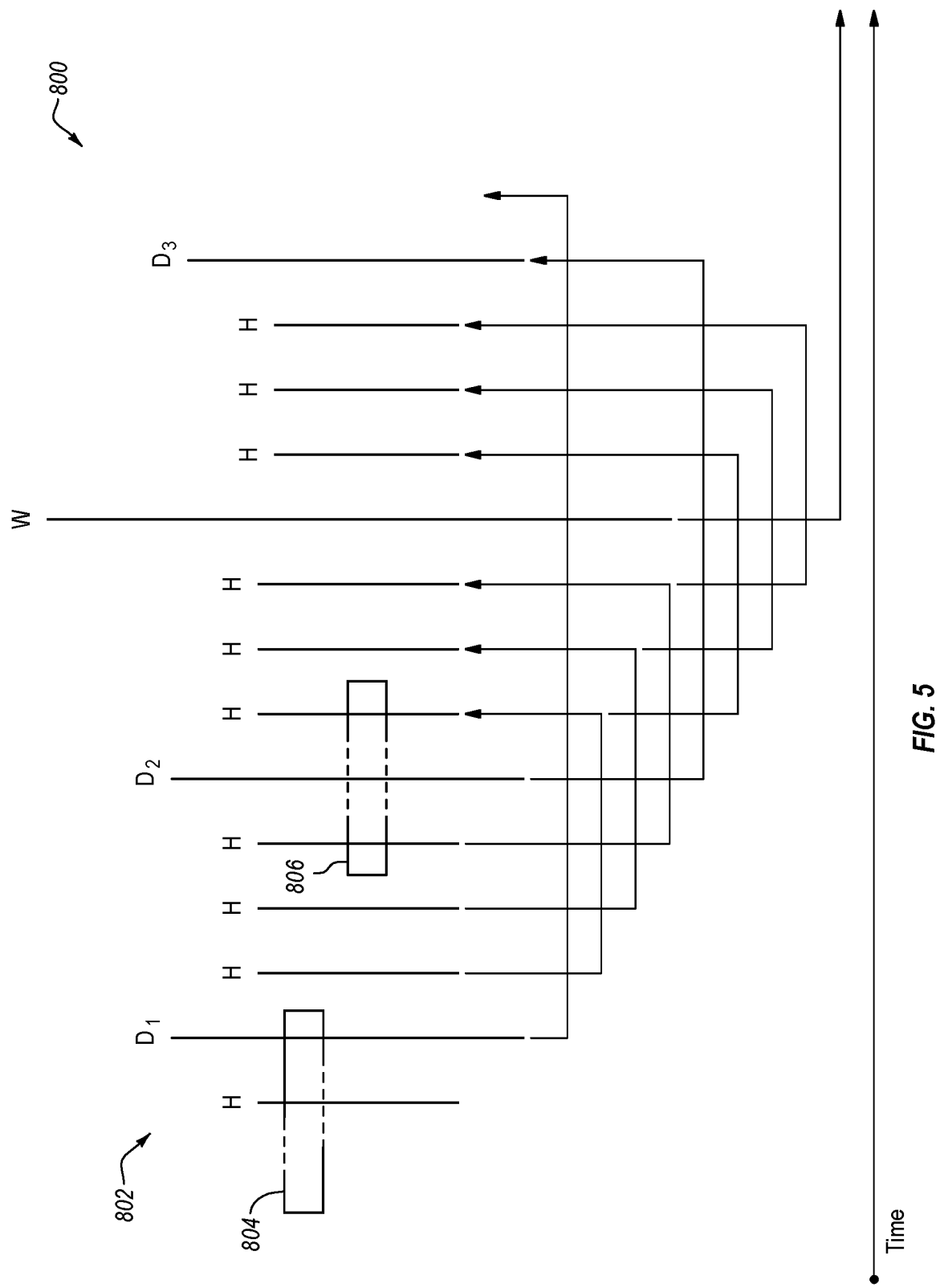
FIG. 5 discloses further aspects of an example arrangement of curtains and associated currency spans.

With reference now to FIGS. 3-5, some aspects of example embodiments of the invention are addressed. Turning first to FIG. 3, a version expiration configuration (VEC) 600 is disclosed. As indicated the VEC 600 can include a variety of different designated time points, or curtains, 602. The illustrated example includes daily curtains "D" 602a and weekly curtains "W" 602b. Further, the configuration in FIG. 3 includes curtains 602a that occur daily so that there are seven such curtains 602a that fall within the first week W1. However, in another configuration, there may be fewer or more curtains within the first week W1, such as a curtain every other day for example, or curtains only on odd/even days. In still another example, hourly curtains may be employed within one or more of the days of the first week W1, or at any other time(s). As these examples illustrate, there is no limit to the number, frequency, types, or combinations of curtains that can be employed in connection with embodiments of the invention. Moreover, one or more curtains can be set by default, while others can be user-specified. As well, curtains can be removed either automatically or based on user input. Thus, it will be appreciated that the scope of the invention is broad and is not limited to the example configurations disclosed herein.

As further indicated in FIG. 3, each curtain 602 may be associated with a particular rule "R", or rules, that specify how a backup version whose currency span crosses that curtain 602 will be treated. That is, the rules "R" determine how much time may be added to the life of that backup version and, thus, the rules "R" form the basis for defining the expiration time of that backup version. One, some, or all, of the rules "R" can be default, user-defined, or otherwise specified.

With continued reference to the example of FIG. 3, and for the purposes of illustration, a first backup version BU-1 was created at the beginning of day 2, followed by the creation of another backup version BU-2 created sometime during day 4. At this point then, BU-1 is no longer the current version, and BU-2 is now the current version. Subsequently, BU-n is created sometime on day 2 of week 2 such that BU-n is now the current version and the default 'never expire' rule now applies to BU-n. Moreover, as BU-2 is no longer the current version, having been replaced in that role by BU-n, the 'never expire' default rule no longer applies to BU-2, and an expiration time can thus be assigned to BU-2. In this example, BU-2 may be referred to as the immediately preceding backup version since it is the backup version after which the next backup version to be created is the current backup version, BU-n in this case.

Because the creation time of BU-2 and the creation time of BU-n are known, the length of the currency span 604 of BU-2, which is needed for determination of the expiration time of BU-2, can be readily established. As can be seen from FIG. 3, several curtains 602 are embraced within the currency span 604. In particular, four daily curtains 602a and one weekly curtain 602b fall within the currency span 604. Thus, rules R4, R5, R6, R7 and R8 must be applied to BU-2 to determine which rule, when applied, results in the most distant expiration time for BU-2.

To illustrate with a simple example involving a comparison of just two rules, if rule R6 specifies that a backup version crossing daily curtain D6 will have its life extended by one day, and if rule R7 specifies that a backup version crossing weekly curtain W1 will have its life extended by one month, then rule R7 will be applied to BU-2 since rule R7 results in the most distant expiration time for BU-2. After application of rule R7, the expiration time is set for BU-2, and no further action is required to ensure that BU-2 will expire on arrival of the expiration time.

It should be noted with regard to the foregoing example that it is not required that the most distant expiration time be set for a backup, although that is desirable in some instances. More generally, the expiration time implicated by any of the applicable rules can be applied to the backup, and various criteria can be employed to inform the selection of a particular rule for application to the backup. Such criteria may include, but are not limited to, the creator of the file that is backed up, and the type of application to which the backup pertains. Any other additional and/or alternative criteria can be employed.

As is evident from FIG. 3, and the other disclosure herein, objects with sparsely occurring versions not well-aligned with the expiration rules nonetheless do not lose essential versions to fill out the coverage timeline at rule-designated points in time. This is because the expiration rules apply to the currency spans of all versions that will always cross the same points in time, whether there are few backup versions or many backup versions of a particular object, or other grouping of data or piece of data. Unless other provisions are made, the latest backup version never expires however old because the currency span is only ended by a newer backup version. The expiration can be computed on each current version when the next version appears and may be generally constant after that, thus permitting mass expirations to be reliably gathered into processing containers. All rules can be applied efficiently and equally to the version, and the longest resulting expiration may be applied to the backup version.

With continued reference to FIG. 3, as well as reference to FIGS. 4 and 5 discussed below, it can be seen that most recent backup version, which may also be referred to herein as a patch, of any file has infinite retention unless explicitly expired. During the appending of a new backup version, the graduated expiration application will calculate and update the expiration of only the most recent previous backup version, if any. Hence, the new update requirement will only incur an overhead on a relatively small percentage of files that have multiple backup versions.

Turning now to FIG. 4, further details are provided concerning a VEC 700 that includes some example implementations of one or more curtains 702 such as may be employed in one or more embodiments of the invention. As noted herein, each curtain 702 may be associated with a respective rule that can be used to facilitate determination of the expiration time of a particular backup version. Some examples of rules are noted above. Yet other rules can specify, by way of illustration only, that most versions expire in a day, but the first existing backup version of the hour (that is, the backup version with a currency span that crosses the top of the hour) has its expiration extended to at least three days from then, a backup version with currency spanning a daily point in time expires at least two weeks from that point, the current version on Saturday at noon, that is, the version that was current at that time, expires at least two month later, unless it is the first Saturday of the month, in which case that current version expires six months later. As these additional examples illustrate, there is no practical limit to the different rules, and combinations of rules, that can be defined and implemented.

In general, time periods of expiration rules can be based on common calendar periods, graduated and nested to expire relatively more aggressively without sacrificing immediate granularity. For example, daily backups for a week, weekly backups for a month, monthly backups for a quarter, and quarterly backups for a year totals 19 versions, whereas, by way of comparison, daily backups for a year totals 365 versions. Neither the 19 versions nor the 365 versions estimates allow for more than one backup per day, which would again accumulate to be significantly more numerous without backup version expiration than with it.

With continued reference to the particular example of FIG. 4, details are provided concerning some example curtains. In general, the curtains, or designated points in time, can be defined using ISO time syntax for year, month, week, day, and time by replacing any numeric fields with sequence expansions, producing simple schedules like 10 minutes past any hour, midnight every first Sunday of the month or half past noon Saturday every third week of the year. The same technique can be applied to any calendar type, although the initial implementation offers standard Gregorian calendar, week of year, and week of month calendars. Further details concerning the creation and implementation of curtains in a VEC environment are provided in the application references in the 'Related Applications' section hereof.

As indicated in FIG. 4, a variety of hourly curtains "H" 702a can be defined, as well as daily curtains "D" 702b, and weekly curtain "W" 702c. In general, the curtains reflect the respective rules with which they are associated. As a first example, the rule associated with curtain H1 is such that any backup version whose currency span crosses H1 will have its life extended by 4 hours, that is, to curtain H5. This is indicated by the arrow extending from H1 to H5. A similar extension would be obtained by a backup version whose currency span crosses H4.

As another example, the rule associated with curtain H2 is such that any backup version whose currency span crosses H2 will have its life extended by 1 hour, that is, to curtain H3. This is indicated by the arrow extending from H2 to H3. Thus, a backup version whose currency span extended across only H1 and H2 would have its life extended by 4 hours since, as between H1 and H2, 4 hours is the longest extension of life that is possible, and once the backup version reached the end of its extended life at H5, the backup version would then expire.

Similar considerations may apply to the daily curtain D1. In particular, and as indicated in FIG. 4, the rule associated with curtain D1 is such that any backup version whose currency span crosses D1 will have its life extended by 8 days, that is, past curtain D2. This is indicated by the arrow extending from D1 to D2.

Finally, as collectively indicated in FIGS. 3 and 4 and discussed in more detail in connection with FIG. 5, the rules associated with each of the curtains may correspond with time extensions applied in such a way that that the lives of various backup versions overlap each other and/or are nested within each other. For example, the time extension provided in connection with H1 overlaps the time extension provided in connection with H4. As another example, the time extension provided in connection with H2 is nested within the time extension provided in connection with H1. Thus, and depending on their respective currency spans and the rules embraced by those currency spans, back up versions may be expiring at a variety of different times and will all eventually be deleted from storage automatically at the end of their respective lives, with the exception of the current backup version which has no expiration time.

With reference now to FIG. 5, further details are provided concerning a VEC 800 that includes some example implementations of one or more curtains 802 such as may be employed in one or more embodiments of the invention. The VEC 800 may be similar to the VEC 600 and VEC 700 at least insofar as VEC 800 includes a combination of a variety of different curtains, such as, for example, hourly curtains "H," daily curtains "D" and weekly curtains "W."

In the illustrated example, several of the hourly curtains "H" are each associated with a respective rule that adds, in this illustrative example, 4 hours to the life of any backup version whose currency span crossed that hourly curtain "H." Thus, for a series of backup versions whose respective currency spans terminate at successive hourly curtains "H," those backup versions will expire in successive hours, thus ensuring that an overly large number of hourly backups are not retained, and are not retained for long periods of time.

On the other hand, the daily curtains "D" can be configured somewhat differently. In general, a first backup version whose currency span 804 crosses the first daily curtain D1 will have its life extended, in this illustrative example, for 3 days. However, a second backup version whose currency span 806 crosses the second daily curtain D2, but not the first daily curtain D1, will have its life extended, in this illustrative example, for only 2 days, that is, to D3. In this example arrangement then, the first backup version may persist longer than the second backup version. Alternatively, the respective rules could be defined such that the second backup version persists longer than the first backup version. More generally however, such rules and configurations can be set according to the needs of the enterprise or other entity, and the scope of the invention is not limited to the illustrative examples disclosed herein.

It should be noted that while example curtains such as hourly curtains, daily curtains, weekly curtains, monthly curtains, and yearly curtains are specifically discussed herein, the scope of the invention is not limited to these examples. By way of illustration, curtains of other granularities, such as bi-weekly curtains, quarterly curtains, and day-specific curtains, for example, can additionally or alternatively be used. More generally, there is no practical limit to the number and types of curtains that can be defined and implemented, nor to the amount of time that can elapse between a curtain and one or more other curtains. Thus, curtains of any number and properties can be employed. Likewise, curtains can recur on some periodic basis, and/or can occur ad hoc. Some additional examples of curtains are disclosed in the application referred to in the 'Related Applications' section hereof.

With general reference now to FIGS. 3-5, it will be appreciated that any number of variations can be implemented either singly, or in any combination. By way of example, an expiration date need not be calculated for each backup version. Rather, in some instances at least, an expiration date can be explicitly set that overrides the expiration date that would otherwise be calculated. As another example, if a backup version has an 'invalid' bit set for any reason, that backup version will be skipped and the creation time of that backup version will not be used in any currency span determinations. Moreover, a backup version can be marked to be skipped even if no 'invalid' bit has been set for that backup version. As a further example, a user may be permitted to disable expiration for one or more backups that are, or would otherwise be, scheduled to expire at a particular time. To continue with an additional example, one, some, or all, of the processes disclosed herein, such as the expiration processes for example, can be performed on an object-by-object basis. However, this is not required and embodiments can alternatively be performed on any other basis, such as a block-by-block, file-by-file, or any other basis or grouping of data. As well, expiration rules can be customized, for example, on an object-by-object basis based on criteria such file type, file location, or file ownership. Other example criteria for expiration rules are disclosed elsewhere herein.

D. Example Processes

Figure 6:
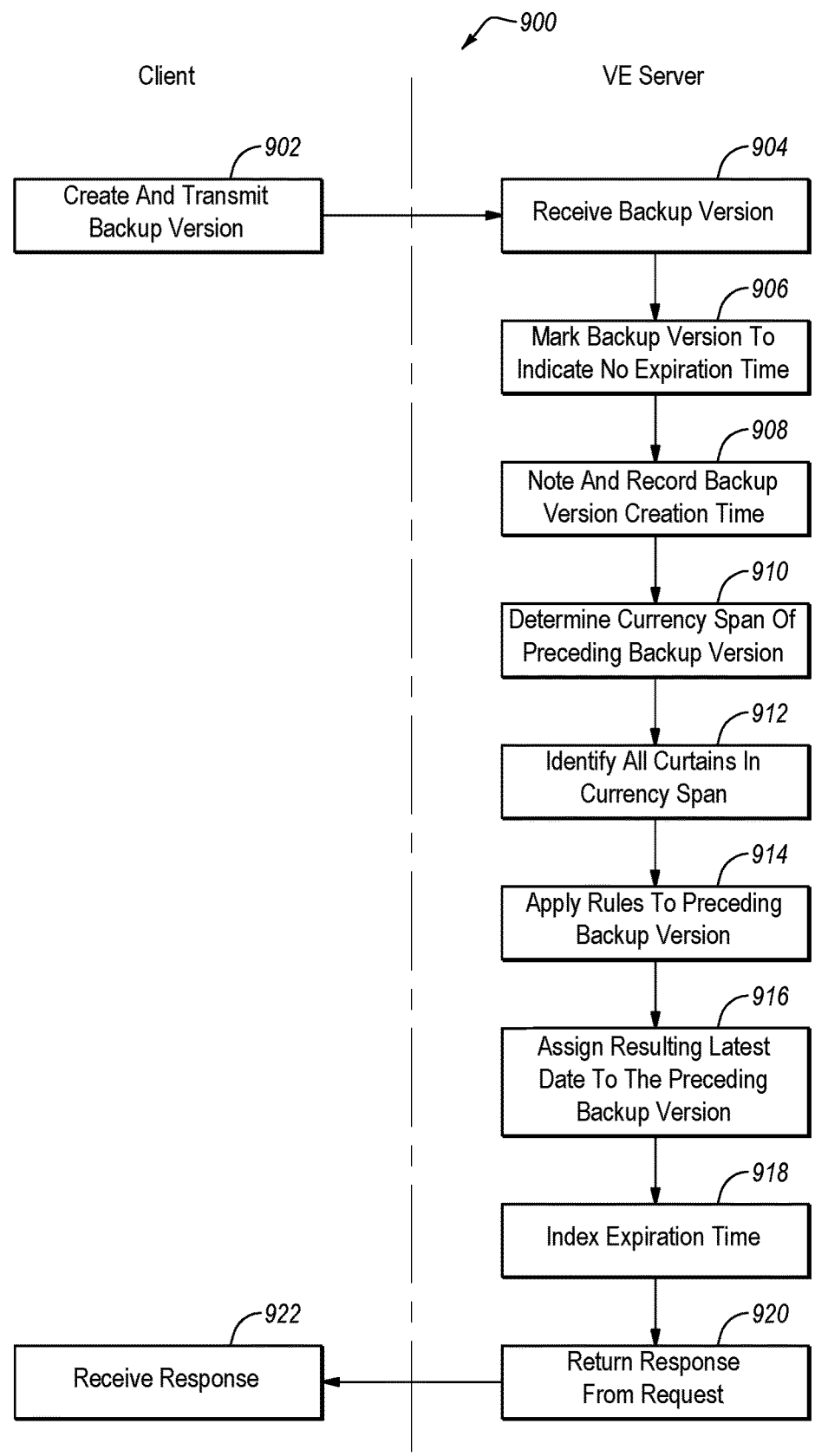
FIG. 6 discloses aspects of an example method for determining an expiration time of a backup version.

With attention now to FIG. 6, details are provided, concerning some example processes implemented by embodiments of the invention. One example of a process for version expiration is denoted generally at 900. Part, or all, of the example process 900, and variations thereof, can be performed by and/or at the direction of a server at a cloud data center. However, the scope of the invention is not limited to this example and, more generally, part or all of the method 900 can be performed by any other entity. Moreover, portions of the method 900 can be allocated amongst a plurality of entities and, accordingly, it is not required that the entire method 900 be performed at, or by, a single entity.

The process 900 may begin when a client, possibly in cooperation with a backup application and backup server, creates and transmits 902 a backup version that is to be stored and possibly used later for restoration of the backed up data to the client and/or one or more other targets. The backup version can be a full backup, an incremental backup, or any other type of backup. The backup version is then received 904 by a version expiration (VE) server for processing.

Because the received backup version is the most recent backup version, and in the absence of any default or other rules to the contrary, the received backup version is marked 906 to indicate that it has no expiration time. Before, at the same time, or after, such marking, the creation time of the backup version is noted and recorded 908. Because the creation time of the new backup version, and the creation time of the immediately preceding backup version are known, the currency span of the immediately preceding backup version can be determined 910. In particular, the elapsed time between the two creation times can be determined. Because the specific creation times of the two backup versions are known, the boundaries of the currency span of the immediately preceding backup versions are thus known as well. Any backup versions that have an 'invalid' bit set may be ignored in the determination 910.

Once the length, and boundaries, of the currency span are known, the currency span can then be examined and a determination 912 made as to which designated points in time, or curtains, fall within that currency span. As noted elsewhere herein, each curtain may have a rule associated with it that defines an amount of time to be added to the life of any backup version whose currency span crosses that curtain.

After the applicable rule, or rules, have been determined 912, each of the rules can then be applied 914 in turn to the immediately preceding backup version. Whichever rule, when thus applied, results in the latest expiration time for the immediately preceding backup version, is the controlling rule, and the expiration time defined as a result of application of that rule is assigned 916 to the immediately preceding backup version. Thus, that the immediately preceding backup version will expire when the assigned expiration time arrives. As well, the expiration time can be included in an index 918 (such as index 206 for example) in association with the backup version, or backup versions, to which that expiration time pertains. In this way, a user or other party or entity can examine the index to determine the status and anticipated expiration times of one, some, or all, backup versions.

Finally, a response to the initial request for storage of a backup version can be returned 920 to one or more recipients, such as the client for example 922, which indicates actual and/or expected expiration times for one or more backup versions, currency spans of one or more backup versions, total storage space occupied by unexpired versions, the number and type of curtains crossed by the current backup version, and/or any other information pertaining to one or more of the backup versions.

E. Aspects of Example Calendars, Policies and Rules

As noted earlier, at least some embodiments of the invention involve the use of one or more designated time points, or curtains, that define when one or more rules take effect with respect to the lifespan of a backup version. No, one, or more, curtains may fall within a currency span of a backup version, that is, the time span during which that backup version is the current version. The addition of time to the lifespan of a backup version, as dictated by a rule or rules, occurs as a result of that backup version having crossed one or more curtains during its currency span.

Details are now provided concerning some specific examples of calendars, curtains and associated policies and rules. With respect first to calendars, it is possible to use any of a variety of calendars and time standards as a common basis for defining when events, such as a rule or policy for example, are to take effect with respect to one or more backup versions. In at least some embodiments, the calendar point in time can be based upon the manner of specifying a date and time as described by ISO 8601. For example, calendar: 2014-12-25T08:00:30Z refers to # Dec. 24, 2014 at 30 seconds past 8 am (Greenwich Mean Time (GMT) or 'Zulu' time). However, because backup expirations often need to be aligned with the work week, like every Monday or Sunday for example, there may be other formats that are better suited to those circumstances.

One such format is based on the week of the year. The week of the year is a way of scheduling events in the business world, and is also described by ISO 8601. The week of the year has no months, and the beginning/ending of the year is adjusted so that no week spans multiple years. In some embodiments at least, every week starts on Monday, and the first week of any year is the first week that included Thursday in the calendar of the year. From that week on, weeks are numbered from 1 to 52, or 53 occasionally, together with a day number within the week.

For example, with a calendar that shows January where Monday, Tuesday, and Wednesday of the first week were in the prior year, the Week Of Year model deems the year to have started at the beginning of the week on Monday, the start of the new year thus being moved back three days. And with a calendar that shows January where Monday, Tuesday, Wednesday, and Thursday of the first week were in a prior year, the Week of Year model deems the year to have started on the following Monday, the start of the new year thus being moved forward three days.

This Week Of Year model differs from the calendar noted earlier in that the Month and Date of that calendar are replaced by a Week and Day (weekday). Particularly, weekofyear: 2014-W52-7T17:30Z refers to # Sunday ($7^{th}$ day of the week) of the 52nd week of the year 2014 at 5:30 pm GMT. This model may be useful for specifying a point in time that is known to fall on a specific day of the week. As well, this model eliminates any connection to the month, which may be desirable in some circumstances.

Another calendar model that is useful in at least some embodiments takes the form of a modification to the Week of Year model discussed above. In this modification, which may be referred to herein as the Week of Month model, the month can be specified in addition to the week and weekday. As in the case of the Week of Year model, every week in the Week of Month model starts on Monday, and the first week of any year is the first week that included Thursday in the calendar of the year. However, the Week of Month model also includes months, and the first week of any month is also the first week that included Thursday in the calendar of the month. From this beginning week of the month, weeks are numbered from 1 to 4, or 5 in some cases, together with a day number within the week.

For example, with a calendar that shows March where Monday, Tuesday, and Wednesday of the first week were in the prior month, the Week Of Month model deems the month to have started at the beginning of the week on Monday, the start of the month of March thus being moved back three days. As another example, where a Calendar shows March where Monday, Tuesday, Wednesday, and Thursday of the first week were in the prior month, the Week of Month model deems the month to have started on the following Monday, the start of the new month thus being moved forward three days. The format for the Week of Month model differs from the Week of Year model in that only the date of the Calendar is replaced by a Week and Day (weekday). In particular, weekofmonth: 2014-03-W2-5T11:59:45Z refers to # Friday ($5^{th}$ day) of the 2nd week of March in 2014 at 15 seconds before noon GMT. This Week of Month model is useful in defining a point in time, because the point in time can be defined relative to a particular week within a month.

The three models noted above are generally restricted to identification of a single point in time. However, it is useful in some circumstances at least to be able to identify multiple points in time. Thus, some variations of those models allow a single item to match a sequence of points in time.

In general, sequences identify the points in time when the rules of a policy will be applied to a backup version. A sequence can be specified as a single exact point in time, but this may not be particularly useful in some circumstances, because rules often apply repeatedly over an extended period of time. One way to accomplish the matching of a single item to a grouping of multiple points in time is to let any numeric field, or fields, be replaced, or parameterized, by the use of corresponding empty parentheses to represent the full set of legal values for that numeric field. In this way, a sequence of points in time can be defined.

While some more particular examples are disclosed elsewhere herein, the following information is presented to illustrate some concepts that apply to at least some cases where parameterization is employed. In general, each expiration of a backup version can be parameterized by the following:

A calendar class field, such as epoch days, weeks, months, or epoch years.

A non-zero cycle duration in units defined by the selected calendar class field (could be permitted negative for referencing cycle in reverse direction).

A time offset between 0 (inclusive) and the cycle length (exclusive), that adjusts the starting position of the cycle.

An expiration interval always applied to the first version of the time period. This is typically the last to be uploaded in the prior time period because it was the first current backup of the time period unless there was a new one uploaded exactly in the first microsecond.

Greenwich Mean Time (GMT). Policy rules may be customized with different cycle offsets for users in different areas of the globe, and it is possible, for example, to implement cycle offset shifts related to Daylight Savings Time.

Before introducing some additional particular examples, the following points are noted. In general, there are many variant forms in the ISO 8601 time specification. The VE expiration policy enforces a subset of this. Separating punctuation is typically required, and every field requires the full number of digits, unless using parentheses. Fields occurring after - or : punctuation may be omitted with the punctuation, and the implicit default for omitted values is the first valid value. The T is required that shows where the time starts, and the Z is required showing that the supported time zone is GMT. Additional time zones may also be supported. Typically, year, month, date, week, and day each have a first legal value of 1. The hours, minutes, and seconds have a first legal value of 0. Finally, 24:00:00 is not a valid time as the standard allows. The following example illustrates some of these points. Note that all text that follows the '#' character on any line below is commentary that is not actually part of the example and would be ignored by the policy processor.

```
vepolicy:                                              # New label to contain ve policies
    <policyname1>:                                     # Name of a policy
        <rulename1>:                                   # Name of a rule of the policy
            calendar: <calseqs>  # calendar sequences for rule:
                                                       # i.e. yyyy-mm-ddThh:mm:ssZ
            weekofyear: <woyseqs> # day-of-year sequences for rule:
                                                       # i.e. yyyy-Www-dThh:mm:ssZ
            weekofmonth: <womseqs> # day-of-month sequences for rule:
                                                       #e.g. yyyy-mm-Ww-dThh:mm:ssZ
            expiration: <integer>                      # seconds after curtain to expire
        <rulename2>:
            [...]
        [...]
    <policyname2>:
        [...]
    [...]
```

The following time periods serve as one non-limiting example of an expiration policy that could be applied to one or more backup versions.

| Rule Name | Calendar Field | Cycle Duration | Cycle Offset | Expiration Interval |
|---|---|---|---|---|
| Yearly | Epoch year | 1 | 0 | 3653 days |
| Quarterly | Year month | 3 | 0 | 366 days |
| Monthly | Year month | 1 | 0 | 92 days |
| Weekly | Epoch day | 7 | 4 days | 31 days |
| Daily | Epoch day | 1 | 0 | 7 days |
| Other | N/A | N/A | N/A | 1 day |

In this example, the first backup version of the year expires after 10 years, the first backup version of the quarter expires after a year, the first backup version of the month expires after a quarter, the first backup version of the week expires after a month, the first backup version of the day expires after a week, and all other backup versions expire after a day. As noted elsewhere herein, where a backup version qualifies as the first of multiple overlapping periods, the greatest qualifying expiration, that is, the expiration time that extends the life of that backup version to the latest future date, is applied. Finally, to minimize, or at least reduce, complexity, all rules can be implemented to reference a common time standard, such as Universal Time, that is, Following are some particular examples of the definition and use of time sequences and parameterization. All times are GMT in these examples, although other common time standards could be used.

1. calendar: 2014-12-25T08:00:30Z # Dec. 24, 2014 at 30 seconds past 8 am, can be converted to calendar: ( )-12-25T08:00:30Z # December 24th, of any legal year at 30 seconds past 8 am.

2. weekofyear: 2014-W52-7T17:30Z # Sunday of the 52nd week of the year 2014 at 5:30 pm, can be converted to weekofyear: ( )-W( )-7T17:30Z # Any week of any year at 5:30 pm.

3. weekofmonth: 2014-03-W2-5T11:59:45Z # Friday of the 2nd week of March in 2014 at 15 seconds before noon, can be converted to weekofmonth: ( )-( )-W2-5T11:59:45Z # Friday of the 2nd week of any month at 15 seconds before noon.

As well, particular times can also be parameterized. One example of this approach is shown below.

weekofyear: ( )-W( )-( )T08:00:30Z # Any week and day at 30 seconds past 8 am, can be converted to weekofyear: ( )-W( )-( )T( ):00:30Z # Any week and day at 30 seconds past any hour.

With continued reference to the foregoing parameterization examples, the parentheses may be filled by up to three integers, like for a loop, to include only specific legal values.

The legal values are the starting number, the limit that should not be exceeded, and the step to add each time to produce the sequence. For example, weekofyear: ( )-W( )-( )T( ):00:30Z # Any week and day of the week at 30 seconds past any hour, can be converted to weekofyear: ( )-W(1;53;2)-( )T( ):00:30Z #odd weeks and any day of the week at 30 seconds past any hour.

When a legal value is omitted, a default is supplied, so the above example can be shortened as:

weekofyear: ( )-W(;;2)-( )T( ):00:30Z # odd weeks and any day of the week at 30 seconds past any hour.

While the parameter values addressed thus far are typically positive values, negative values can also be used. The use of negative values lends flexibility in determining times and also enables unusual circumstances and cases to be addressed.

In particular, when numbers in parentheses are specified with negative values, those values run in the direction opposite that associated with the use of positive values. For example, days of a month in natural order are 1, 2, 3, . . . , 29, 30, 31. When negative values are used, the days of a month can be defined with the form −31, −30, −29, . . . , −3, −2, −1 which adapts automatically to months with different numbers of days. In this approach, −1 is always the last day of the month. The loop can be traversed in the opposite direction for better alignment with the end, for example, of the month. In particular:

calendar: ( )-( )-(−1;1;−3)T00Z # Go from the end to the start of the month by threes, always including the last day of the month.

Thus, for January, the sequence includes 1, 4, 7, 10, 13, 16, 19, 22, 25, 28 and 31, and for February in a leap year, the sequence includes 2, 5, 8, 11, 14, 17, 20, 23, 26 and 29.

Moreover, this same sequence can alternatively be obtained simply by specifying a negative incremental amount. Thus, with the default start and limit defined, the sequence will run in the opposite direction. As such, the previous example can be rewritten as:

calendar: ( )-( )-(;;−3)T00Z # Go from the end to the start of the month by threes, always including the last day of the month.

These negative numbers only work inside of parentheses, but it is still possible to select a single value using negatives. Thus, for example.

calendar: ( )-( )-(−1;−1;)T00Z # The last day of any calendar month.

The negative numbers tend to be most useful where the maximum can vary. Dates in a month, weeks in a year, and weeks in a month, because otherwise the same result could have been achieved using different positive numbers.

Thus far, the discussion has concerned the use of only valid parameter values. However, invalid or illegal values may appear in some circumstances, whether intentionally or inadvertently. Typically, if an attempt is made to use a number in a sequence that is never within the bounds, the entire policy will be rejected. For example, looping over months, if 0, 13, or −13 are used, the policy will fail because these will never be correct. That is, there is no month 0 and, since there are only 12 possible months, there is also no month 13. For the same reason, a month −13 is invalid as well. Some cases are more complicated however. For example, the policy will be rejected for a day of the month of 0, 32, or −32, but a day value of 31 will not, at least initially, be rejected even if the month is 02 (February) which only has 28 or 29 days. That is, although the day value 31 is invalid for February, this may not become apparent until that date is actually applied, at which time that date, and any other day(s) that do not exist for February, will simply be skipped.

As discussed above, a variety of sequences of multiple points in time can be used to identify the times at which one or more rules of a policy will be applied. Any given policy can include or specify one or more such sequences. Below is one example of a policy that specifies multiple sequences of times. It should be noted that all text below that follows the '#' character on any line is commentary that is not actually part of the example and would be ignored by the policy processor.

---

```
vepolicy:
    30day:
        weekly:
                    # At 6am GMT each week, current backup expires after 31 days
            weekofyear: ( )-W( )-1T06Z
            expiration: 2678400
        daily:
            # At 6am GMT each day, current backup expires after 7 days
            calendar: ( )-( )-( )T06Z
            expiration: 604800
        hourly:
            # At 6am GMT each hour, current backup expires after 1 day
            calendar: ( )-( )-( )T( )Z
            expiration: 86400
        other:
            # Default rule: every other backup expires after 1 hour
            expiration: 3600
    90day:
        weekly:
            # At 6am GMT each week, current backup expires after 92 days
            weekofyear: ( )-W( )-1T06Z
            expiration: 7948800
        daily:
            calendar: ( )-( )-( )T06Z
            expiration: 604800
        hourly:
            calendar: ( )-( )-( )T( )Z
            expiration: 86400
        other:
            expiration: 3600
    1year:
        monthly:
            # At 6am GMT on first Monday of each month, current backup expires after 1 year
            weekofmonth: ( )-( )-W1-1T06Z
            expiration: 31622400
        weekly:
            weekofyear: ( )-W( )-1T06Z
            expiration: 7948800
        daily:
            calendar: ( )-( )-( )T06Z
            expiration: 604800
        hourly:
            calendar: ( )-( )-( )T( )Z
            expiration: 86400
        other:
            expiration: 3600
```

---

It should be noted that in some instances at least, the policies are similar to each other, and two or more of the rules overlap. For example, the 6 am first Monday of each month expiring after one year is also 6 am the first Monday of each week, expiring after 92 days, so the 1 year expiration 'wins' because it is longer. That is, as between these two rules, the latter rule results in a relatively longer extension of the life of the backup version to which it is applied and, as such, the latter rule controls and is applied to the backup version. As another example of rule overlap, the first Monday of each week is also 6 am of other days and the 92 or 31 day expiration 'wins' because it is longer. In a similar manner, the daily expiration supersedes the hourly, and the hourly expiration supersedes the default expiration.

Finally, a single rule of a policy may have multiple type labels with corresponding point in time sequences specified, and each label may have multiple space-separated point in time sequences specified. One example of this is set forth below.

```
...
mixedrule:
    calendar: ( )-( )-31T03Z ( )-02-29T05Z
    weekofmonth: ( )-( )-W05-05T05Z
    weekofyear: ( )-W53-05T05Z
    expiration: 86400
...
```

This abnormal rule should give 10-day expiration to any current backup at 3 am on the 31st of any month with 31 days or at 5 am on February 29th, or 5 am on Friday the fifth week of any month with 5 weeks, or Friday the last week of any year with 53 weeks.

With the foregoing discussion of calendars, policies and rules in view, a few additional points are noted. First, any named/selectable VE policy always has at least one default rule defined with no points in time, that is, no calendar, weekofyear, or weekofmonth label. This may appear anywhere in the policy. The expiration is a minimum expiration for all backup versions.

Second, other rules of a policy contain points in time, for example, one or more calendar, weekofyear, or weekofmonth labels. As noted elsewhere herein, each backup version has a life span from the time when the backup version was created until the time of creation of the next backup version of the same named object. And any point in time of a policy rule found within the life span causes that policy to be applied to the backup version with the expiration seconds of the rule added to the point in time to define the expiration time. After all points in time of all rules, including any default rule(s), have been used to compute expiration, the latest expiration time produced is applied to the backup version.

Figure 7:
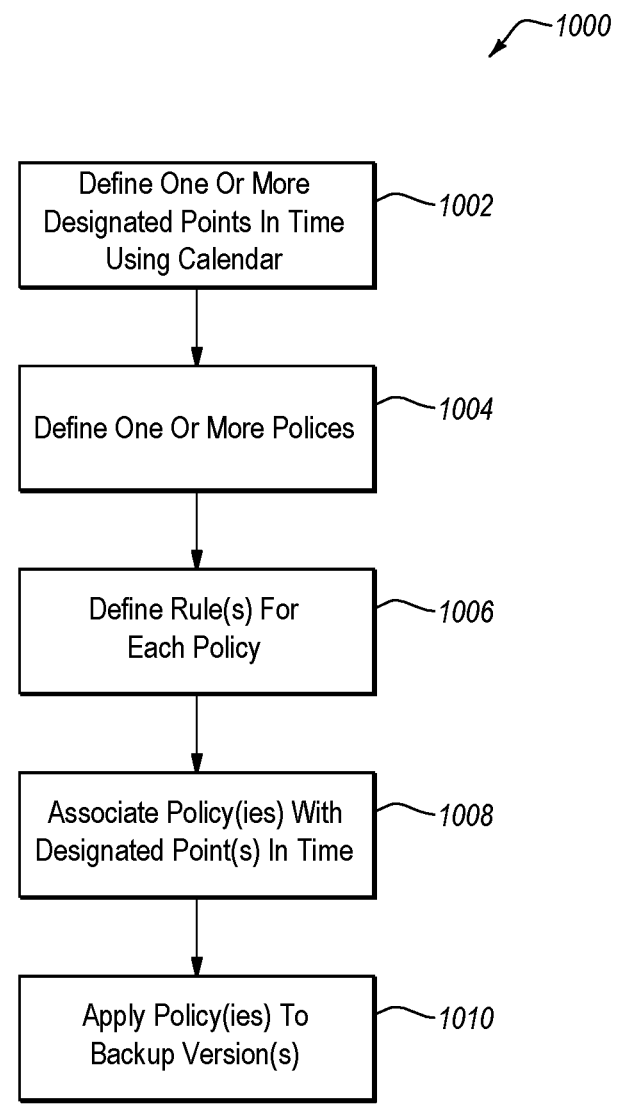
FIG. 7 is a flow diagram disclosing aspects of a method for defining and implementing a calendar, policies and rules.

With the foregoing disclosure of calendars, policies and rules in view, attention is directed now to FIG. 7 which discloses aspects of methods for implementing and using calendars, policies and rules, where one example method is denoted generally at 1000. In some embodiments, part or all of the method 1000 can be performed at a cloud data center server (see, e.g., 200a—FIG. 1). In some more particular examples, some or all of the method 1000 can be performed by a version expiration application (see, e.g., 208—FIG. 1). Neither of the aforementioned arrangements is required however.

Initially, one or more designated points in time are defined 1002 using a common calendar. The designated point(s) in time, also referred to herein as 'curtains,' can be a single designated point in time, multiple different points in time, or a sequence of regularly recurring, or irregularly recurring, points in time, to name a few examples. The designated point(s) in time can be defined at any level of granularity, examples of which include a minute, hour, day, week, month, year, or any combination of these. In general, the defined designated point(s) in time may collectively reflect a judgment or philosophy as to considerations such as, but not limited to, how long various backup versions should be kept, and how many backup versions should be kept.

In at least some instances, such a judgment or philosophy is embodied in the form of one or more policies. Thus, the next part of the method 1000 may be the definition of one or more policies 1004, various examples of which are disclosed herein. In general however, each policy can include or implicate one or more particular rules. Thus, the definition of a policy 1004 may, in some instances, involve the aggregation together of one or more rules. As such, the rules may already have been defined or, alternatively, the rules can be defined after the policy is defined. In some embodiments, the policy that has been defined 1004 includes, as a minimum, a default rule that does not correspond with any particular point(s) in time. That is, the default rule does not specify an expiration time for a backup version.

Once the overall policy has been defined 1004, one or more rules can then be defined 1006 that constitute the policy. In general, the rules can be applied to set expiration times for one or more backup versions. More specifically, the rules of that policy can be associated 1008 with a designated point in time. Thus, when the designated point in time arrives, the associated policy is applied 1010 to the backup version, or versions, whose currency span includes that designated point in time.

It should be noted that while the various processes in the example method 1000 are indicated as occurring in a particular order, the scope of the invention is not limited to that order. Rather, one, some or all of the processes indicated in FIG. 7 can be performed in any other suitable order consistent with the present disclosure. By way of illustration, the rules can be defined 1006 prior to definition of the policy 1004. Thus, in some instances, a library of rules can be employed from which a user can select various rules for fulfillment of a policy then defined, or later defined.

Figure 8:
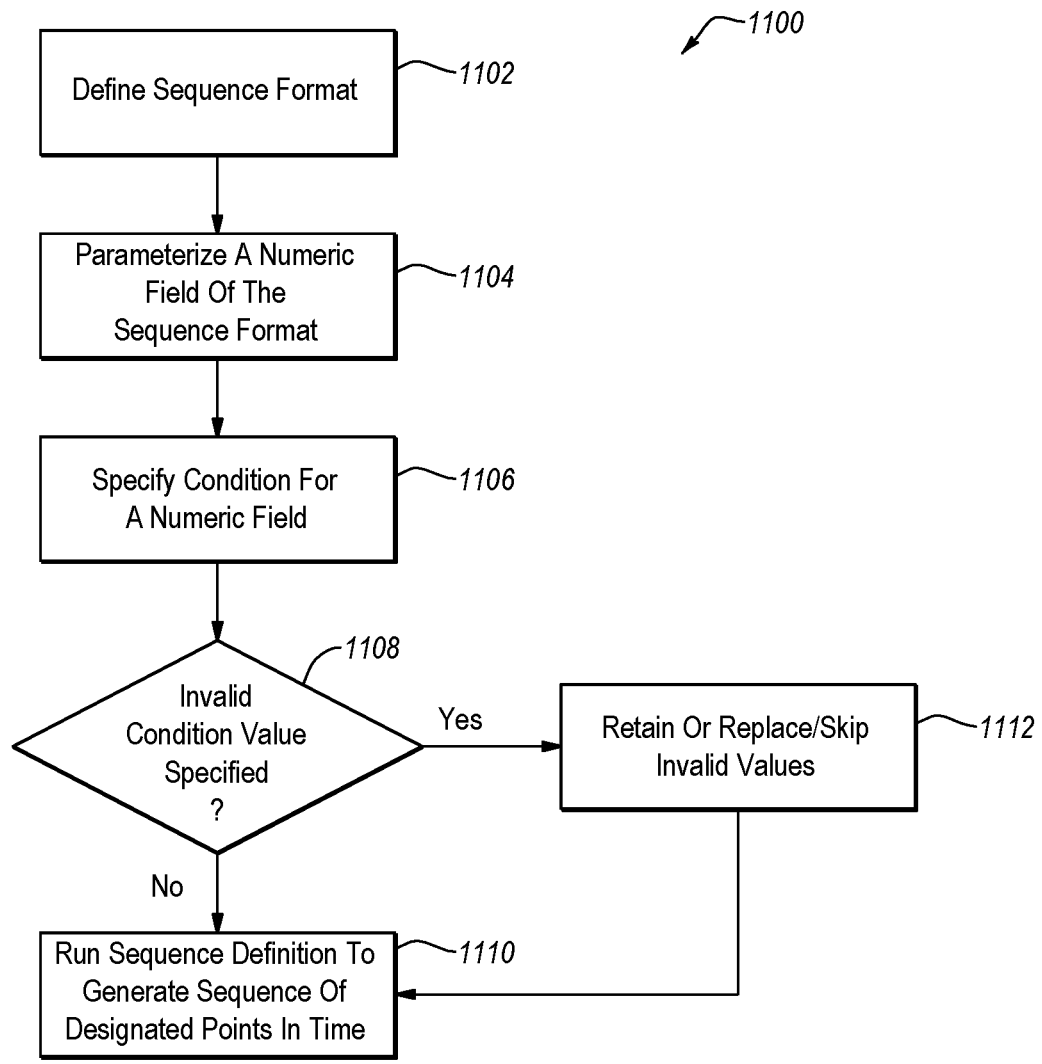
FIG. 8 is a flow diagram disclosing further aspects of a method for defining a sequence definition that can be used to generate a sequence of designated points in time.

With reference finally to FIG. 8, further details are provided concerning methods for defining a time sequence, particularly a time sequence having multiple different points in time at which one or more rules can be applied to one or more backup versions. One example of such a method is denoted generally at 1100 in FIG. 8.

The method 1100 can begin when a sequence format is defined 1102 that includes one or more numeric fields. The sequence format can be any time sequence format, such as the calendar, weekofyear, or weekofmonth sequences disclosed herein. In at least some embodiments, the sequence format includes one or more numeric fields. The numeric fields each concern an aspect of one or more points in time.

After the sequence format is defined 1102, the method 1100 advances and one or more of the numeric fields in the defined sequence format are parameterized 1104. As noted elsewhere herein, parameterization of the numeric field(s) 1104 can be performed, for example, by the use of corresponding empty parentheses to represent the full set of legal values for that numeric field, so that a sequence of multiple points in time can be defined.

Separately, or as part of the parameterization process 1104, one or more boundary or other conditions can be specified 1106 for one or more of the parameterized numeric fields, where the conditions will dictate how the sequence of designated points in time will be generated. For example, one or more of the parameterized numeric fields can include conditions such as the starting number, a limit that should not be exceeded, and the increment of time between points in time of the sequence. Additional, or alternative, conditions can also be employed. A given numeric field can accommodate any number of conditions, and there is no requirement that a value be specified for each condition, nor for any particular condition(s). Thus, a numeric field can include values for one or more conditions while, for one or more other conditions of that numeric field, no values are specified. Each condition can be numerically specified with a corresponding parameter value. For example, the increment of time condition can be specified as '3.'

Finally, a check can be performed 1108 to determine if any invalid values have been specified for the numeric fields of the sequence format. If no invalid values are specified, the sequence definition is completed and then run 1110 to generate a sequence of designated points in time, or curtains. On the other hand, if one or more invalid values have been specified for one or more numeric fields of the sequence format, those invalid values can 1112 be replaced or allowed to remain in place and simply skipped when the sequence definition is run 1110 to generate a set of designated points in time.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer a storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, switch, server, database, or storage node may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving a most recent backup version of client data;
marking the most recent backup version to indicate that the most recent backup version has no expiration time;
determining a currency span of an earlier backup version that is the backup version whose creation time is next most recent after a creation time of the most recent backup version;
identifying all curtains in the currency span, each of the curtains being associated with a respective rule concerning a life of the earlier backup version;
applying each of the rules to the earlier backup version, and whichever rule whose application results in the latest expiration time for the earlier backup version is the controlling rule; and
assigning an expiration time to the earlier backup version according to the controlling rule.

2. The method as recited in claim 1, wherein each of the rules defines a respective amount of time that can be added to a life of the earlier backup version.

3. The method as recited in claim 1, wherein each curtain corresponds to a respective point in time.

4. The method as recited in claim 1, wherein the currency span is defined using a creation time of the most recent backup version and a creation time of the earlier backup version.

5. The method as recited in claim 1, wherein the currency span is an elapsed time between the creation time of the most recent backup version and the creation time of the earlier backup version.

6. The method as recited in claim 1, further comprising deleting the earlier backup version at, or after, its expiration time.

7. The method as recited in claim 1, wherein the rules are applied in turn to the earlier backup version.

8. The method as recited in claim 1, further comprising storing the most recent backup version.

9. The method as recited in claim 1, further comprising storing the expiration time in an index in association with the earlier backup version.

10. The method as recited in claim 1, further comprising transmitting a response to an entity, wherein the response indicates any one or more of: actual and/or expected expiration times for one or more backup versions; currency spans of one or more backup versions; total storage space occupied by unexpired versions; and, the number and type of curtains crossed by the current backup version.

11. The non-transitory storage medium as recited in claim 1, wherein the operations further comprise storing the expiration time in an index in association with the earlier backup version.

12. The non-transitory storage medium as recited in claim 1, wherein the operations further comprise transmitting a response to an entity, wherein the response indicates any one or more of: actual and/or expected expiration times for one or more backup versions; currency spans of one or more backup versions; total storage space occupied by unexpired versions; and, the number and type of curtains crossed by the current backup version.

13. A non-transitory storage medium having stored therein computer-executable instructions which, when executed by one or more hardware processors, implement and/or cause the performance of operations comprising:
 receiving a most recent backup version of client data;
 marking the most recent backup version to indicate that the most recent backup version has no expiration time;
 determining a currency span of an earlier backup version that is the backup version whose creation time is next most recent after a creation time of the most recent backup version;
 identifying all curtains in the currency span, each of the curtains being associated with a respective rule concerning a life of the earlier backup version;
 applying each of the rules to the earlier backup version, and whichever rule whose application results in the latest expiration time for the earlier backup version is the controlling rule; and
 assigning an expiration time to the earlier backup version according to the controlling rule.

14. The non-transitory storage medium as recited in claim 13, wherein each of the rules defines a respective amount of time that can be added to a life of the earlier backup version.

15. The non-transitory storage medium as recited in claim 13, wherein each curtain corresponds to a respective point in time.

16. The non-transitory storage medium as recited in claim 13, wherein the currency span is defined using a creation time of the most recent backup version and a creation time of the earlier backup version.

17. The non-transitory storage medium as recited in claim 13, wherein the currency span is an elapsed time between the creation time of the most recent backup version and the creation time of the earlier backup version.

18. The non-transitory storage medium as recited in claim 13, wherein the operations further comprise deleting the earlier backup version at, or after, its expiration time.

19. The non-transitory storage medium as recited in claim 13, wherein the rules are applied in turn to the earlier backup version.

20. The non-transitory storage medium as recited in claim 13, wherein the operations further comprise storing the most recent backup version.

* * * * *